Figures 1, 2:
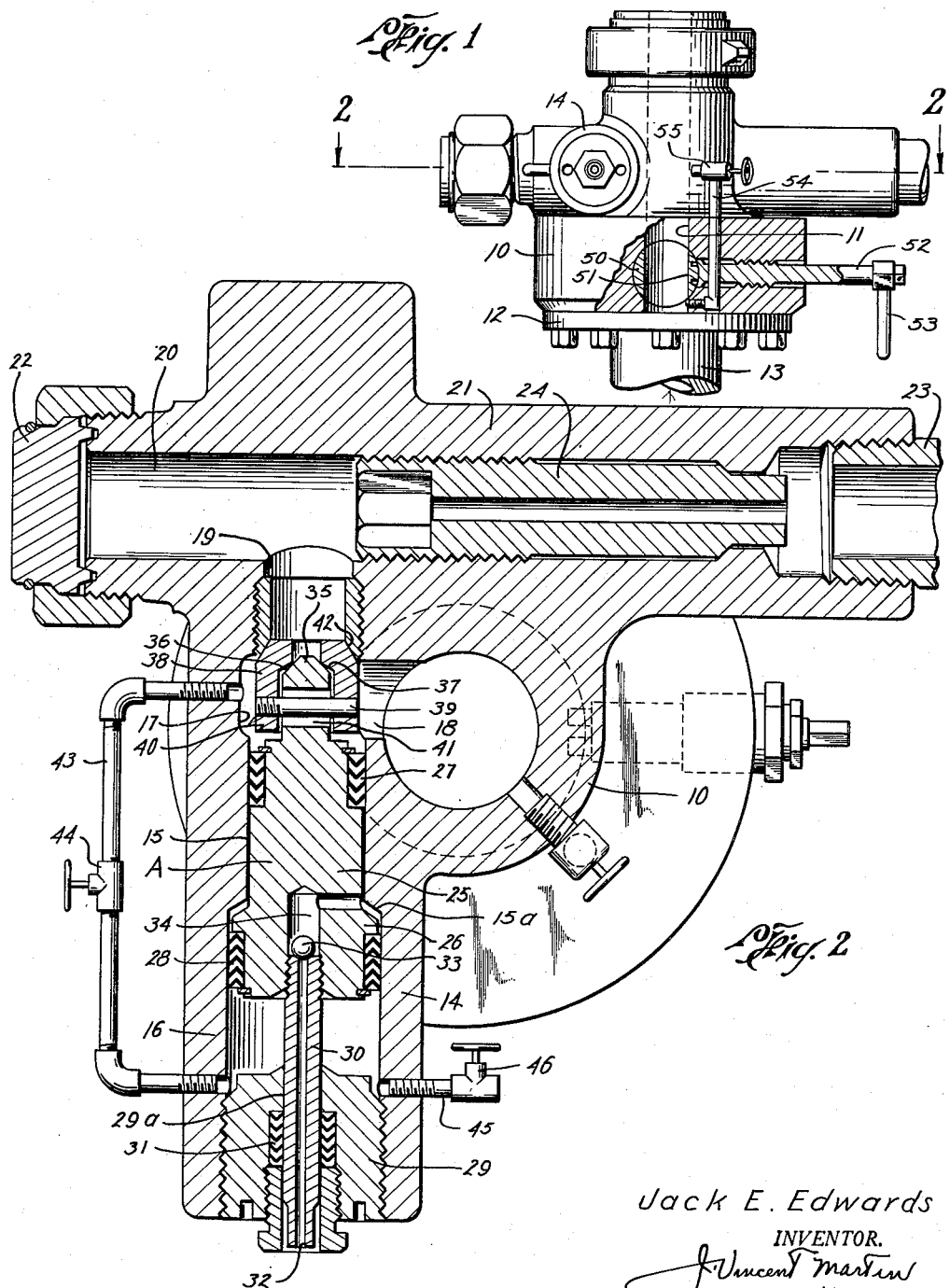

Aug. 10, 1954

J. E. EDWARDS 2,685,892

FLOW CONTROL UNIT

Filed Jan. 26, 1951

2 Sheets-Sheet 1

Jack E. Edwards
INVENTOR.

BY Vincent Martin
and
Jack E. Edwards

ATTORNEYS

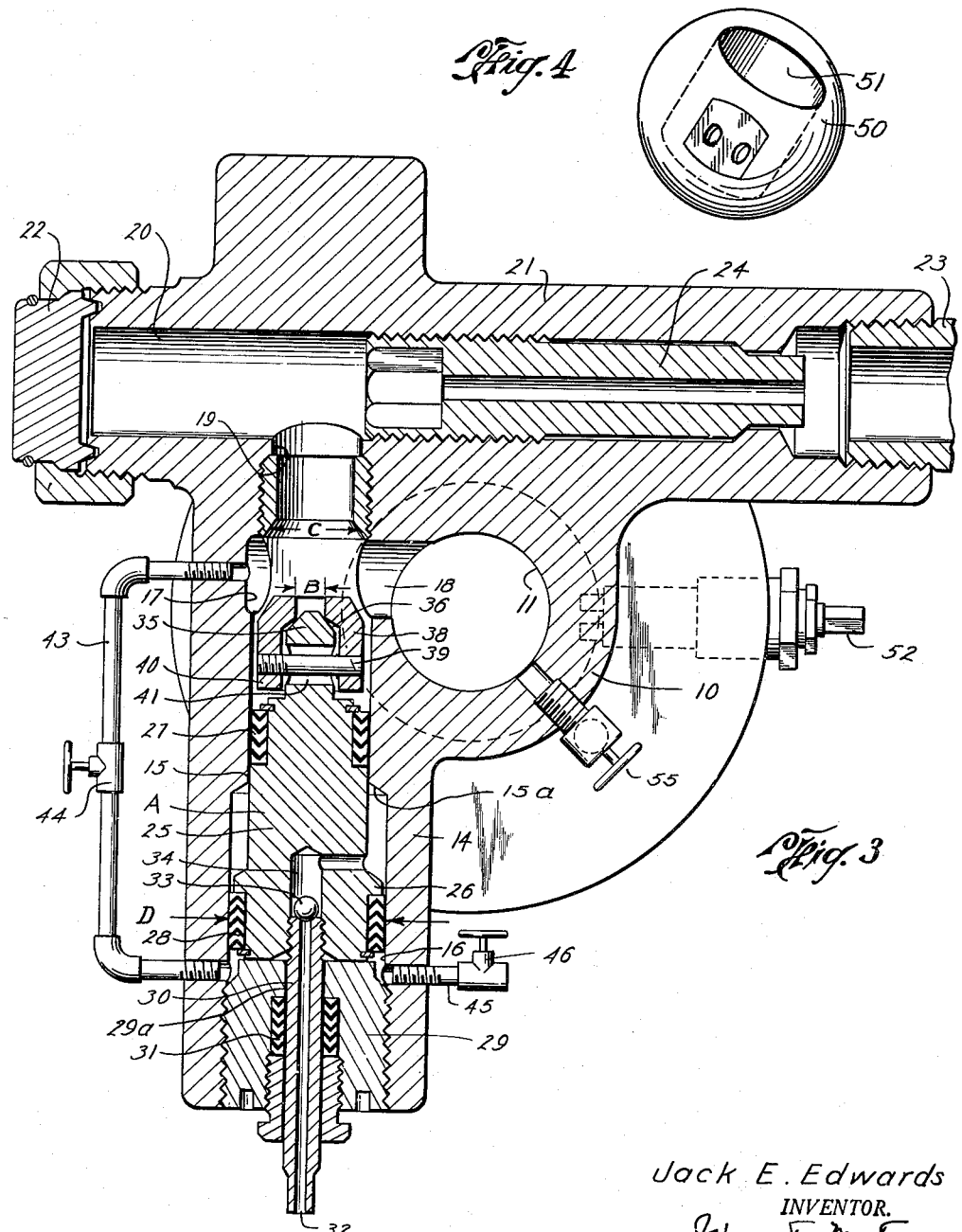

Patented Aug. 10, 1954

2,685,892

UNITED STATES PATENT OFFICE 2,685,892

FLOW CONTROL UNIT

Jack E. Edwards, Houston, Tex., assignor to Oil Center Tool Company, Houston, Tex., a corporation of Texas Application January 26, 1951, Serial No. 207,968

8 Claims. (Cl. 137—630.14)

1

This invention relates to new and useful improvements in flow control units.

One object of the invention is to provide an improved control unit adapted to be connected with a well pipe for controlling the flow of well fluid from said pipe and having a pressure-actuated valve incorporated therein for completely shutting off flow through the unit.

An important object of the invention is to provide an improved flow control unit having a main shut-off or control valve which is actuated by the pressure of the fluid being controlled, whereby manual force is not required to urge the valve to closed position against the pressure, which makes the unit particularly adaptable for use in controlling the flow of high pressure fluids such as are encountered in deeper wells.

A particular object is to provide an improved flow control unit having a pressure-actuated valve, both sides of which are exposed to the operating pressure and wherein the valve is constructed to present certain areas to the pressure when the valve is open and different areas to said pressure when the valve is closed, whereby any desired movement or operation of the valve may be effected by said pressure.

Still another object is to provide a pressure-actuated valve in a flow control unit, wherein the valve controls the usual full opening passage and wherein will open upon a relatively small differential of pressure on opposite sides thereof and after opening will continue its movement to full open position, together with means for cushioning movement of the valve after initial opening, whereby the valve is relatively quick opening but slow in movement to fully open position to thereby provide for smoother operation.

A further object is to provide a valve having a valve element at one end thereof with a tubular valve head mounted on the valve element for limited movement relative thereto; the valve head co-acting with a flow passage to control flow therethrough and the valve element co-acting with the bore of the valve head for controlling the flow through said bore, with the arrangement permitting the valve head and element to function as a single unit in the direction of movement of the valve toward a closed position and at the same time allowing the valve element to open independently of the valve head upon movement of the valve in a direction opening the same, whereby the areas exposed to the operating pressure during the opening movement of the valve may be varied during the opening cycle to obtain desired rate of opening movement of said valve.

2

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a view, partly in section and partly in elevation of a flow control unit, constructed in accordance with the invention, Figure 2 is an enlarged, horizontal cross-sectional view, taken on the line 2—2 of Figure 1, and showing the control valve closed, Figure 3 is a similar view, with the valve open, and Figure 4 is an isometric view of the main valve which is incorporated within the unit.

In the drawings, the numeral 10 designates a body having a vertical bore or opening 11. The base of the body is adapted to be connected by a suitable flange 12 with a flow pipe or conductor 13 and this pipe may be the well tubing which extends from a flowing well. The upper end of the pipe or conductor 13 communicates with the passage or vertical bore 11 of the body.

A lateral extension 14 is preferably formed integral with the body and extends outwardly at one side thereof as is clearly shown in Figure 2. The extension is generally tubular in cross-section and has an axial bore 14 and a counterbore 16 formed therethrough. The inner end of the bore 15 is slightly enlarged at 17 to provide a chamber, and this chamber communicates through an opening 18 with the upper end of the vertical bore 11 of the body 10. The chamber 17 is in communication through an opening or port 19 with one end of the bore 20 of a second lateral extension 21. As is clearly shown in Figure 2, the extension 21 is disposed at approximately a 90° angle to the extension 14. It will thus be obvious that flow from the well pipe or conductor 13 may pass upwardly through the vertical bore 11 of the body, then through the port 18 into chamber 17, through opening 19 and into the bore 20 of the lateral extension 21.

One end of the bore 20 of the extension 21 is closed by a suitable cap or plug 22, while the opposite end of the bore is connected with a flow line or pipe 23. A suitable choke bean 24 having the desired orifice size is threaded into the bore 20, and this bean may be inserted and removed through that end of the bore 20 which is normally closed by the closure 22. It will be evident that with the foregoing arrangement flow from the conductor or pipe 13 may be through the body, the inner end of the extension 14, and then through the second extension to the flow line or pipe 23.

For controlling the flow from the bore 11 of the body to the bore 20 of the lateral extension communicating with the flow line, a pressure-operated valve A is mounted within the extension 14. This valve includes a generally cylindrical piston 25 which has a sliding fit within the central portion 15 of the bore of the extension 14. The outer end of the piston body has an enlarged head portion 26 which is slidable within the counter-bore 16 of the extension. Suitable packing 27, which may be of the chevron type, is mounted on the piston 25 while similar packing 28 is carried by the enlarged head 26, said packings functioning to seal off between the valve element or piston and the walls of the bore and counter-bore.

The outer end of the counter-bore 16 is closed by a threaded plug 29 and a tubular stem 30 which has one end threaded into the enlarged head 26 of the piston is slidable through an axial bore 29a formed in the plug. Suitable packing 31 seals off around this tubular stem. The stem is provided with an axial bore 32 which is normally closed by a downwardly seating check valve 33. The bore of the tubular stem 30 is in communication with an angular passage 34 which communicates with the area between the enlarged head 26 and the internal shoulder 15a which is formed between the bore 15 and the counter-bore 16 of the extension 14. It will be evident that as the piston 25 moves in an outward direction toward the plug 29 which closes the outer end of the extension 14, the check valve 33 will open to admit air into the space above the enlarged head 26 within the counter-bore to prevent creating a vacuum in this area. At the same time, if there is a leakage of pressure past the inner packing 27 on the piston body 25 the check valve will close to prevent escape of this pressure.

The inner end of the piston body 25 is formed with an inner cylindrical valve element 35, having an annular seating surface 36 and the cross-sectional area of the valve element is considerably less than the cross-sectional area of the piston; the seating surface 36 of the valve element 35 is adapted to engage an annular valve seat 37 formed within an outer tubular valve member or head 38. As is clearly shown in Figures 2 and 3, the tubular valve member or head loosely encompasses the valve element and is connected thereto by means of a pin 39; the pin is secured within openings 40 in the head and extends through a diametrically extending opening 41 in the element, with the opening 41 being larger in diameter than the pin, whereby a relatively loose fit between the valve element 35 and the valve member 38 is produced. This permits for a limited movement of the valve member or head 38 with respect to the valve element 35. The combined cross-sectional area of the valve element 35 and valve member 38 is slightly less than the inner end of the piston body 25 which is, in turn, less in cross-sectional area than the enlarged head 26 at the outer end of the piston.

The valve head or member 38 is adapted to engage a valve seat 42 which is mounted within the opening 19 and said valve seat has a diameter which is considerably larger than the diameter of the valve seat 37 which is engaged by the valve element 35. The cross-sectional area of the seat 42 is indicated by C in Figure 3.

When the valve is in a seated position the parts are as shown in Figure 2, and the valve head 38 is engaging the seat 42 while the valve element 35 is engaging its seat 37. Pressure from the conductor 13 and from the vertical bore 11 of the body is present within the chamber 17, and this pressure is adapted to be conducted through a pipe or conductor 43 to the outer end of the counter-bore 16. A suitable hand valve 44 controls flow through the pipe 43. Also connected in the extension 14 and communicating with the counter-bore 16 is a vent pipe 45 having a hand valve 46 connected therein. With the hand valve 44 open and the valve 46 closed, it will be evident that pressure from the chamber 17 is conducted through the pipe 43 and into the counter-bore, whereby the same pressure is present on both sides of the piston 25. Since the enlarged head 26 at the outer end of the piston 25 within the counter-bore is of greater cross-sectional area than the inner end of said piston, it will be evident that pressures equalized on opposite sides of the valve will cause the valve A to be moved to its closed position (Figure 2) and so long as the pressure conditions remain equalized, said valve will remain closed.

To unbalance the pressure conditions the hand valve 44 is closed and the valve 46 is opened to atmosphere to bleed the pressure from the outer end of the counter-bore, which pressure is acting against the enlarged head 26, thereby reducing the pressure in the counter-bore 16. Since the pressure acting on the inner end of the piston body 25, with the exception of the area B of the valve seat 37 (Figure 3) remains substantially constant, the reduction of pressure in the counter-bore will allow the pressure to move the piston body 25 outwardly to disengage the valve element 35 from its seat 37. At this time the pressure acting against the under side of the valve member or head 38 has been maintaining this member seated and independent movement of the valve element 35 may occur because of the loose connection between said element and the head 38. Unseating of the valve element 35 may be accomplished by a relatively small pressure differential across the piston 25 because the entire cross-sectional area of the piston, except for the area B of the valve seat, is being acted upon to urge the valve toward an open position. As soon as the valve element 35 is unseated the entire cross-sectional area of the piston is exposed to the pressure, but because flow is at this time permitted through the opening and past the seat 37 a pressure drop in chamber 17 occurs, with the result that reduced pressure is applied to the piston in a direction tending to move the valve toward fully open position. The reduction in applied pressure more than offsets the increased area B exposed to that pressure so that a slowing down of the rate of movement is effected as the valve moves toward fully open position. As the pressure continues to bleed from the counterbore 16 through valve 46, the piston continues its outward movement and through the pin 39 unseats the tubular valve member 38; there is no resistance to unseating of this larger valve member because pressures thereacross were equalized when valve element 35 opened. Upon unseating of valve member 38 the full bore, as indicated by C of the threaded port 19, conducts the flow. The device thus makes possible the use of a large valve 38 closing the larger opening 19 without the disadvantage of requiring a high pressure differential across the piston 25 to effect initial opening of said valve.

From the foregoing, it is evident that with the valve closed and with pressures on opposite sides of the valve equalized, the valve A is in its closed position. Pressure acts upon the enlarged head 26 at the outer end of the piston 25 and also upon the inner cross-sectional area of the piston less the area B of valve seat 37 to hold the valve A closed. Thus, pressure acting on area D, which is the cross-sectional area of the head 26, opposes pressure acting on the cross-sectional area of the inner end of the piston body 25, less area B. Venting of the counter-bore 16 reduces pressure acting against the head 26 and when this pressure bleeds down to a predetermined point as determined by the difference in areas exposed at the inner and outer ends of the piston the valve element 35 is unseated. This, in effect, adds additional cross-sectional area to the inner end of the piston 25 and with the valve A open (Figure 3) pressure acting on area D of the enlarged head 26 is opposed by pressure acting on the entire cross-sectional area of the inner end of the piston 25. As soon as the valve 35 opens, flow may occur past the valve seat 37 to reduce the pressure acting against the inner end of the piston, and this pressure reduction is sufficient to more than offset the additional area represented by B, which has been exposed to pressure by opening of the valve 35, so that there is effected a slowing down of movement of the valve to avoid excessive impact or shock.

For shutting off flow through the vertical bore 11 independently of the valve A, a master valve 50 (Figure 1) is mounted in the lower portion of the bore 11. This valve is of the rotary type and has a diametrically extending opening 51 which is adapted to be aligned with the bore to permit flow or to be misaligned with the bore to shut off flow. The rotary type valve 50 is actuated by a shaft 52 which extends outwardly through the wall of the body and which may be rotated by means of a suitable handle 53. When the valve 50 is in a closed position the high pressure within the pipe or conductor 13 might make it difficult to manually rotate the valve 50 and for the purpose of equalizing pressures across the valve a suitable by-pass line 54 is provided. The line 54 communicates with the bore 11 of the body above and below the rotary valve 50 and has a suitable hand valve 55 connected therein. It will be evident that when the valve 55 is opened pressures on opposite sides of the rotary valve are equalized, thereby facilitating manual rotation of said valve.

The operation of the unit is believed obvious from the foregoing. The body 10 is connected to the well pipe 13 so that the high pressure fluid within the pipe may flow upwardly through the bore 11. Normally, the rotary valve 50 which may be termed the master valve, is in the open position and flow is upwardly into the bore 11 of the body.

Assuming the pressure actuated valve A to be in a closed position, as shown in Figure 2, the valve member or floating head 38 of the valve is engaging the seat 42, while the valve element 35 of said valve is engaging the seat 37 within the floating head. The pressure within the bore 11 is, of course, present within the chamber 17 surrounding the valve member 38 and valve element 35, and this pressure is also conducted through the line 43 to the counter-bore 16 at the opposite side of the valve A. The vent valve 46 is, of course, closed, and thus pressures around the valve A are equalized.

Referring to Figure 3 the cross-sectional area of the valve seat 37 is indicated as B with the cross-sectional area of the enlarged portion 26 of the valve A being indicated as D. These two areas together with the cross-sectional area of the inner end of the piston 25 are the effective areas which enter into the operation of the valve. With the valve A closed, the pressure from the bore 11 acting against the floating valve member 38 holds this valve element in a seated position. The pressure from the bore 11 is also acting against the inner end of the piston 25, less the area B of closed valve element 35, exposed in the chamber 17 and is tending to move the valve element 35 off of its seat 37. This same pressure is also present within the counter-bore 16 and is acting on the enlarged portion 26 of said piston and the larger area D of the portion 26 assures that the valve A will be held in its seated position.

When it is desired to open the valve A the hand valve 44 in line 43 is closed, and the vent or bleeder valve 46 is opened, and this reduces the pressure in the counter-bore. For the purposes of illustration, it may be assumed that the pressure within the pipe 13 and bore 11 is 2,000 pounds, which pressure is present on both sides of the valve A when the valve is closed. When the vent valve 46 is opened, the 2,000 pounds pressure in the counter-bore and acting against the enlarged portion 26 of the piston is relieved, and as this pressure is reduced to a point determined by the difference in areas between the effective area D of the portion 26 and the effective area of the inner end of the piston 25, the piston 25 will be moved to unseat the valve element 35. Immediately that the valve element 35 is unseated the pressure is applied to the additional area of the valve element 35 and also pressures are equalized across valve member 38 so that the entire inner end of the piston 25 is exposed to the pressure. Although increased effective area is, in effect, added to the inner end of the piston 25 immediately following opening of the valve, the flow of fluid through the opening within the valve seat 37 causes a pressure reduction in chamber 17 which more than offsets such additional area. Since lesser effective pressure is acting on the inner end of the piston and since bleeder valve 46 has been adjusted to control the escape of pressure from counterbore 16, the subsequent movement of the valve A is slowed. However, before opening of valve A, the differential between the effective areas on opposite sides of the piston was greater so that only a relatively small pressure drop is required in the counter-bore 16 to initially open the valve element 35. Thus, when valve element 35 unseats, considerable pressure still remains in the counter-bore 16 and this pressure acts as a shock absorber which further restricts rapid movement of the piston 25 to its outer position. In actual practice the pressure in the counter-bore may be reduced from 2,000 pounds to 1,600 pounds, at which time the valve element 35 is unseated; this means that at the time the entire inner end of the piston is exposed to full pressure, there is still 1,600 pounds pressure in the counter-bore 16 to function as a shock absorber to prevent rapid movement of the valve to its fully open position. Further shock absorbing is effected by the change in pressure acting on the inner end of the piston which automatically retards the rate of movement of said piston. Therefore, with the arrangement shown the effective area B of the valve seat 37 is subtracted from the effective area of the inner end of the piston prior to initial opening but since this element is smaller than the valve member 38 closing opening 19, more of the area of the inner end of the piston 25 may be acted upon and a lesser differential of pressures across the valve is necessary to open the valve than would be the case if the larger valve member 38 had to be unseated first. After the valve 35 opens then the effective pressure in chamber 17 is reduced and the valve thereafter moves to its fully open position at a slower rate; the pressure within the counter-bore, having to escape through the restricted vent pipe 45, functions as a shock absorber to prevent excessive impact during opening movement. So long as the vent valve 46 remains open, the pressure within conductor 13 and bore 14 functions to hold the valve A in its open position.

When it is desired to reclose the valve, it is only necessary to close the vent valve 46 and reopen the valve 44 in line 43 to again equalize pressures on opposite sides of the valve. Since the area D of the enlarged outer portion 26 of the piston is larger than the effective area of the inner end of the piston, the valve A will be moved to its closed position.

During the normal operation of the valve A, the check valve 33 functions to admit air behind the enlarged portion 26 of the piston on the outward movement of said piston. On the inward movement of the piston which is relatively slow, the check valve tends to float above its seat and the air previously admitted escapes through the passage 32. In the event the ball 33 should seat during closing movement the air in the bore 15 above the enlarged portion 26 can escape past the upper sealing elements 27 to allow closing movement of the main valve. In the event a leakage should develop past the upper packing elements 27 of the piston when the valve is in its closed position, sudden surge of high pressure will assure seating of the check valve 33 to prevent the escape of pressure fluid from the unit.

The foregoing disclosure and description of the invention is illustrative and explanatory thereof and various changes in the size, shape and materials, as well as in the details of the illustrated construction may be made, within the scope of the appended claims, without departing from the spirit of the invention.

Having described the invention, I claim:

1. A flow control unit including, a body adapted to be connected with a flow conductor and having a flow passage therethrough, a cylinder formed within the body and having one end in communication with the flow passage, a valve seat within the passage beyond the end of the cylinder, a movable valve piston within the cylinder having its inner end exposed to the pressure in the flow passage, the outer end of the piston having a larger cross-sectional area than its inner end, whereby when pressures across the piston are equalized the piston is moved in a direction toward the flow passage, a valve assembly secured to the inner end of the piston and including a valve element extending axially from the piston and of a diameter less than the diameter of the piston and a tubular valve member encompassing the valve element and secured thereto for limited movement thereon, said valve member being adapted to engage the valve seat and having a central opening which is opened and closed by the valve element, a conduit extending from the flow passage to the outer end of the cylinder for conducting the pressure from the flow passage against the outer end of the piston to thereby equalize the pressures across the piston and move the valve element and the valve member to seated positions, a control valve in said conduit, and means for bleeding the pressure from the outer end of the cylinder to unbalance the pressures across the piston to permit pressure in the flow passage acting against the inner end of the piston to initially unseat the reduced valve element and to thereafter unseat the tubular valve member.

2. A control unit as set forth in claim 1, wherein the means for bleeding the pressure from the outer end of the cylinder is a line extending from said cylinder and a manually operated bleeder valve.

3. A control unit as set forth in claim 1, wherein the connection between the valve element and the valve member is a transverse pin secured to the valve member and extending through a transverse opening in the valve element, said opening being of a size which is larger than the pin.

4. A flow control unit including, a body adapted to be connected with a flow conductor, said body having a cylinder formed therein with the outer end of said cylinder being closed, the body having a flow passage communicating with the inner end of the cylinder, a valve seat within the flow passage adjacent the inner end of the cylinder, said cylinder having a bore and a counterbore, a movable piston within the bore of the cylinder having its inner end exposed to the pressure in the flow passage, the outer end of the piston being enlarged and movable within the counterbore of the cylinder, a valve assembly secured to the inner end of the piston and including an axial valve element and a tubular valve member encompassing the valve element of a diameter less than the diameter of the piston, means for securing the tubular valve member to the valve element for independent limited movement with respect thereto, said valve member being adapted to engage the valve seat within the passage, said valve element being adapted to engage a valve seat within the bore of the tubular valve member, a conduit connecting opposite ends of the cylinder for conducting pressure from the flow passage to the outer end of the cylinder to equalize pressures across the piston and thereby move the valve element and valve member to seated positions, a control valve in said conduit, and means for bleeding the pressure from the outer end of the cylinder to unbalance the pressures across the piston to permit the pressure in the flow passage acting against the inner end of the piston to initially unseat the valve element and to subsequently unseat the tubular valve member.

5. A control unit as set forth in claim 4, together with a passage in the outer end of the piston which establishes communication between the counterbore of the cylinder and the area exteriorly of the cylinder.

6. A control unit as set forth in claim 4, wherein the connection between the valve element and the valve member is a transverse pin secured to the valve member and extending through a transverse opening in the valve element, said opening being of a size which is larger than the pin.

7. A control unit as set forth in claim 4, together with sealing rings on the piston for sealing between the piston and the bore of the cylinder, and additional sealing rings on the enlarged portion of the piston for sealing between the piston and the counterbore.

8. A control unit as set forth in claim 4, wherein the flow passage beyond the valve seat is provided with a tubular choke means which is removably mounted therein.

References Cited in the file of this patent

UNITED STATES PATENTS

| Number | Name | Date |
|---|---|---|
| 318,889 | Haydn | May 26, 1885 |
| 336,724 | Lamb | Feb. 23, 1886 |
| 620,829 | Batchelor | Mar. 7, 1899 |
| 742,308 | Gerrard | Oct. 27, 1903 |
| 801,682 | Osborn | Oct. 10, 1905 |
| 822,306 | Sanger | June 5, 1906 |
| 1,046,548 | Bloom | Dec. 10, 1912 |
| 1,636,859 | Dempler | July 26, 1927 |
| 1,655,729 | Jones | Jan. 10, 1928 |
| 1,777,128 | Powell | Sept. 30, 1930 |

FOREIGN PATENTS

| Number | Country | Date |
|---|---|---|
| 609,081 | France | May 3, 1926 |
| 483,835 | Great Britain | Apr. 27, 1938 |